United States Patent
Randall

[11] 3,771,672
[45] Nov. 13, 1973

[54] VERTICAL CLOSING TAILGATE FOR TRUCKS
[75] Inventor: Francis R. Randall, Mount Gilead, Ohio
[73] Assignee: Harsco Corp., Camp Hill, Pa.
[22] Filed: Dec. 29, 1971
[21] Appl. No.: 213,341

[52] U.S. Cl. .............................................. 214/77 P
[51] Int. Cl. ............................................ B60p 1/48
[58] Field of Search ............... 214/77 R, 77 P, 75 T

[56] References Cited
UNITED STATES PATENTS
2,792,135  5/1957  Wood .............................. 214/77 P
3,451,572  6/1969  Rossoni .......................... 214/77 P X
3,602,381  8/1971  Size et al. ........................... 214/77 P Primary Examiner—Gerald M. Forlenza
Assistant Examiner—Frank E. Werner
Attorney—Palmer Fultz

[57] ABSTRACT

A tailgate type loading apparatus for trucks of the type that includes a loading platform that can be pivoted between a load lifting position and a tailgate position. The apparatus is characterized by a closing arm and associated operating means for selectively locking and releasing said loading platform in the tailgate position.

2 Claims, 4 Drawing Figures

INVENTOR.
FRANCIS R. RANDALL

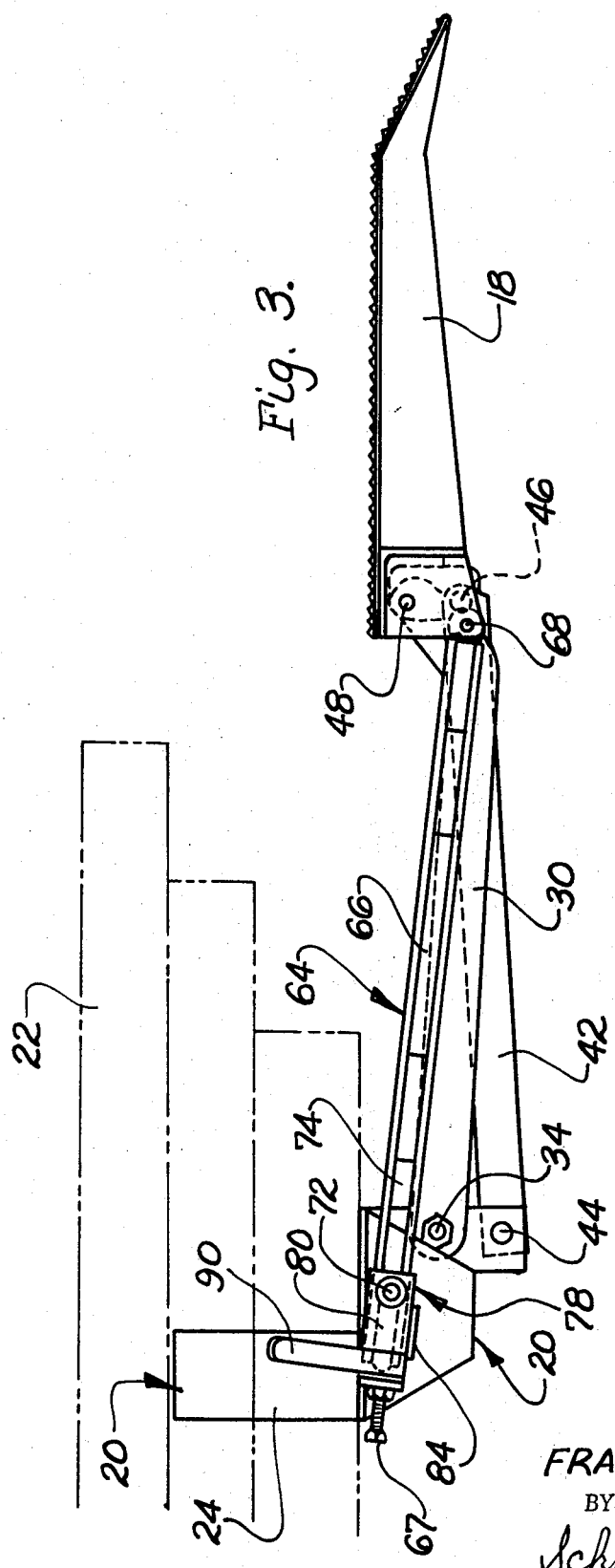

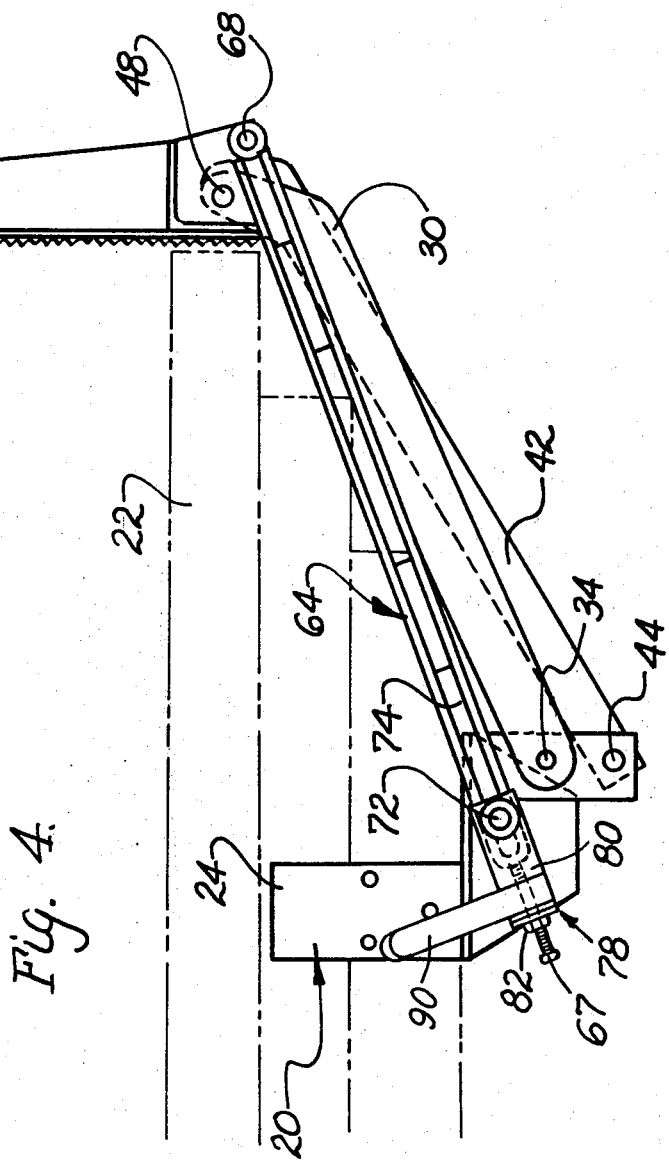

VERTICAL CLOSING TAILGATE FOR TRUCKS

This invention relates to loading apparatus and particularly to an improved power operated loader adapted to be mounted on a truck or other platform to be loaded.

In general, the loading apparatus of the present invention comprises a frame means on which are mounted a pair of lift arms which in turn carry a load lifting platform. A power means, preferably in the form of a hydraulic cylinder, is utilized to move the load lifting platform from between a ground level load supporting position and a truck bed or platform level position at which latter position the load being lifted is readily transferred to the truck bed or platform.

In addition, when the loading apparatus is truck mounted it is adapted to rotate the load lifting platform to a tailgate forming position wherein the platform serves as a substitute for the conventional tailgate of the vehicle.

As a primary aspect of the present invention, the loading apparatus includes a novel closing arm structure that functions to automatically pivot a load lifting platform to a tailgate position wherein it forms a closure for the rear of the truck body. The apparatus includes a frame means that is mounted on the truck with said closing arm structure being operative between said frame means and the lift platform and provided with operating means whereby the operator can selectively connect the closing arm means in force transmitting relationship between the frame and the lift platform whereby the normal power means of the apparatus functions to swing the lift platform to a tailgate position.

As another aspect of the present invention, more particularly the novel closing apparatus and associated operating means function to permit the operator to manipulate a lever to selectively establish a fixed pivot for a closing arm member when it is desired to move the lift platform to its tailgate position. At the same time, the operator can render the operating means inoperative such that the power means can now perform its normal function of cycling the lift platform between a lower load receiving and upper load delivering positions.

It is, therefore, an object of the present invention to provide an improved loading apparatus that includes a novel closing arm apparatus and an associated operating means for selectively utilizing the power means of the apparatus to swing the lift platform into a tailgate position.

It is another object of the present invention to provide an apparatus of the type described that includes a simple lever actuated operating means whereby the operator can easily selectively establish a fixed pivotal connection between a loading arm member and the frame of the apparatus so as to cause the apparatus to move its lift platform to a tailgate position.

Further objects and advantages of the present invention will be apparent from the following description, reference being had to the accompanying drawings wherein a preferred form of embodiment of the invention is clearly shown.

IN THE DRAWINGS

FIG. 3 is a second side elevational view, corresponding to FIG. 1, which illustrates the lift platform of the apparatus in an intermediate position; and FIG. 4 is still another side elevational view, corresponding to FIGS. 1 and 3, which illustrates the linkage of the apparatus with the lift platform in a tailgate position.

Figure 1:
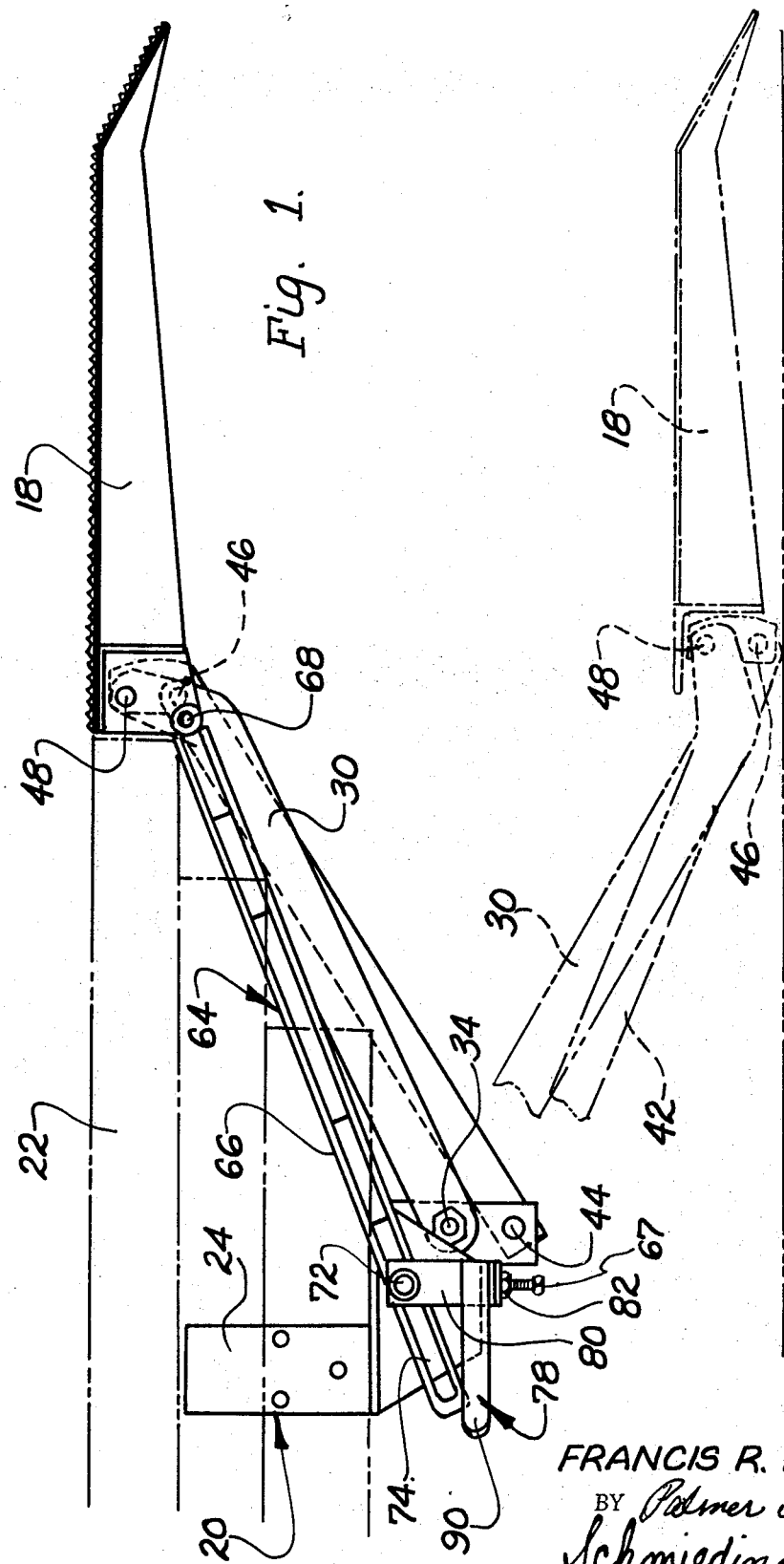
FIG. 1 is a side elevational view of the loading apparatus constructed in accordance with the present invention which illustrates the lift platform in a raised load delivering position as well as in a lowered load receiving position.
Figure 2:
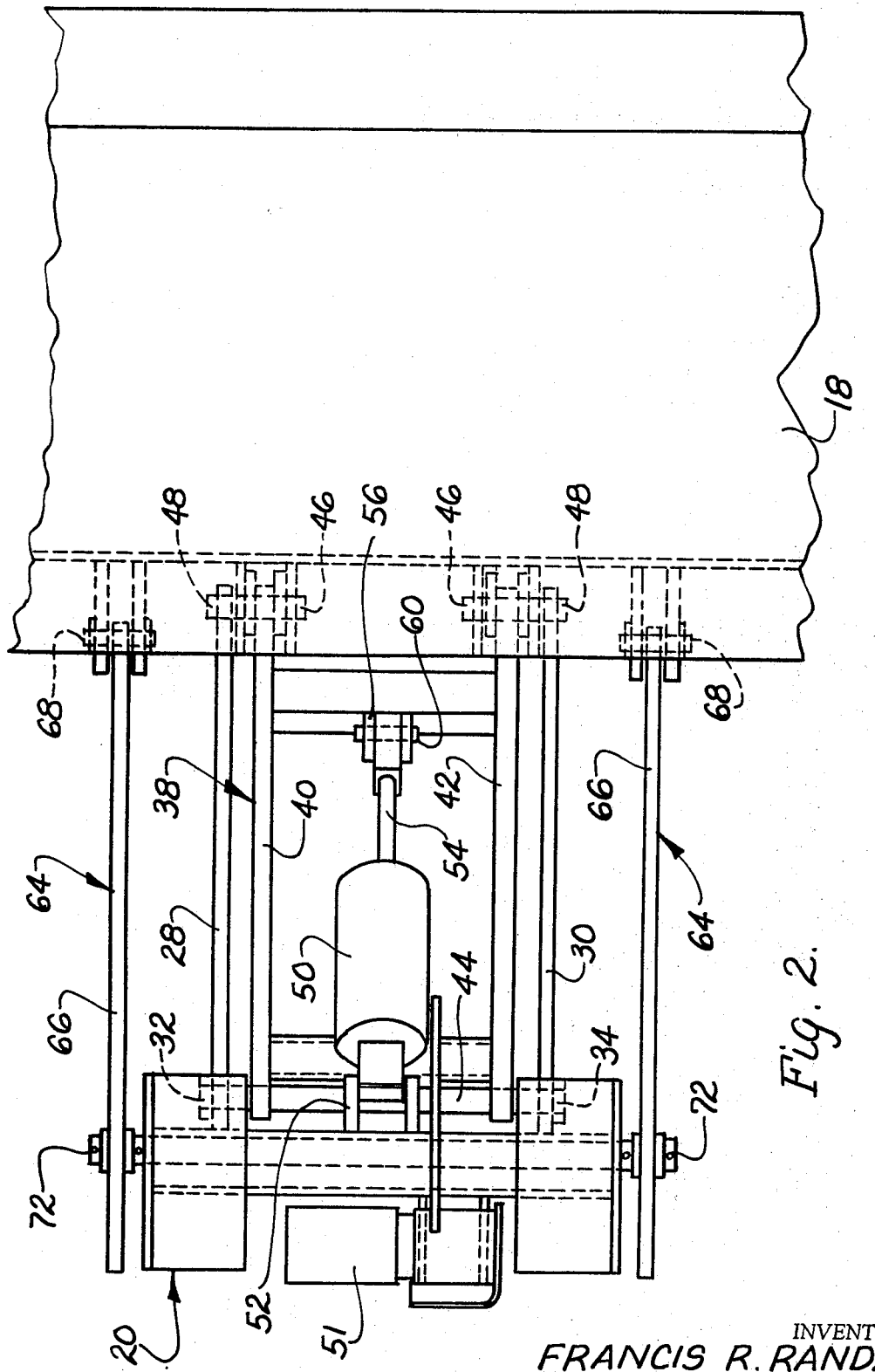
FIG. 2 is a plan view of the loading apparatus of FIG. 1.

Referring in detail to the drawings, FIG. 1 and 2 illustrate a loading apparatus constructed in accordance with the present invention which includes a frame means indicated generally at 20 adapted to be attached by means of a bracket 24 to a truck frame indicated diagrammatically at 22 or other platform to be loaded.

With continued reference to FIGS. 1 and 2, the apparatus further includes a main lift arm means indicated generally at 38 which includes members 40 and 42 having their inner ends pivotted to a mounting rod 44 and their outer ends connected to a lift platform 18 at platform pivots 46. As is best seen in FIG. 2, the apparatus further includes secondary arms 38 and 30 having inner ends pivotally mounted to frame means 20 at pivots 32 and 34. It should be mentioned that the secondary arms 28 and 30 have their outer ends connected to platform pivots 48 disposed above the previously mentioned platform pivots 46 for the outer ends of main lift arm means 38.

At this point it should be mentioned that main lift arm means 38 is powered by a conventional hydraulic cylinder 50 which is pivotally connected to frame means 20 at the brackets 52 and which includes a ram 54 pivotally connected to main lift arm means 38 by a pivot pin 60 at the brackets 56.

Reference is next made to the novel closing arm structure of the present invention indicated generally at 64 which comprises a closing arm member 66 having a permanent front pivotal connection 68 with platform 18, and a rear connection with transverse rod 72 formed by a slot 74 in the inner end of closing arm member 66. Such rear connection is normally of a lost motion type since rod 72 is free in slot 74.

With continued reference to the closing arm apparatus, the rear connection can be made fixed by a pivot forming assembly indicated generally at 78 that includes spaced flanges 80, a transverse end flange 82, and a bottom flange 84.

With continued reference to the drawings, the pivot forming assembly 78 further includes an operating lever 90 utilized for swinging the pivot forming assembly between the operating position of FIG. 1 and the tailgate forming position of FIG. 4.

In operation, the loading apparatus is normally operated by actuating power cylinder 50 by means of suitable hydraulic valving, not illustrated, so as to supply pressurized fluid from pump 51 selectively to opposite ends of power cylinder 50.

By selectively actuating the valving the lift platform 18 is moved from the lower ground engaging position shown in dotted delineation in FIG. 1 to the upper load delivery position of FIG. 1.

When the operator desires to fold platform 18 to the tailgate position of FIG. 4 the lift platform is first lowered to the ground. Pivot forming assembly 78 is next utilized to form inner pivots for the closing arm members 64 by swinging lever 90 from the horizontal position of FIG. 1 to the vertical position of FIG. 4. The flange 84 is held tightly against the bottom of closing arm 66. Power cylinder 50 is then energized to a "raise position" and the lever 90 is held until the left end of closing arm 66 bottoms on the set screw 67. Pivot forming assembly 78 is next utilized to form inner pivots for the closing arm members 64.

I claim:

1. A loading apparatus comprising, in combination, frame means adapted for attachment to a platform to be loaded; lift arm means including an inner end pivotally attached to said frame means and an outer end; a loading platform including a first pivotal connection with said outer end of said lift arm means, said loading platform being pivotable to a vertically extending tailgate position; power means for swinging said lift arm means to raise and lower said loading platform; an inner closing arm pivot on said frame means; an outer closing arm pivot on said platform; a closing arm including inner and outer connections with said closing arm pivot, one of said connections comprising a slot slideably receiving one of said closing arm pivots; and closing arm operating means including a pivoted lever for selectively locking and releasing said one closing arm pivot in said slot.

2. A loading apparatus comprising, in combination, frame means adapted for attachment to a platform to be loaded; lift arm means including an inner end pivotally attached to said frame means and an outer end; a loading platform including a first pivotal connection with said outer end of said lift arm means, said loading platform being pivotable to a vertically extending tailgate position; power means for swinging said lift arm means to raise and lower said loading platform; an inner closing arm arm pivot on said frame means; an outer closing arm pivot on said platform; a closing arm including a slot on one end for forming a lost motion connection with one of said closing arm pivots, and a rigid connector on the other end for the other of said closing arm pivots, and closing arm operating means for locking said slot in said closing arm with said one closing arm pivot.

* * * * *